Jan. 18, 1944.  E. E. ENGLUND  2,339,689
SEED PLANTER
Filed Aug. 27, 1942  2 Sheets-Sheet 1
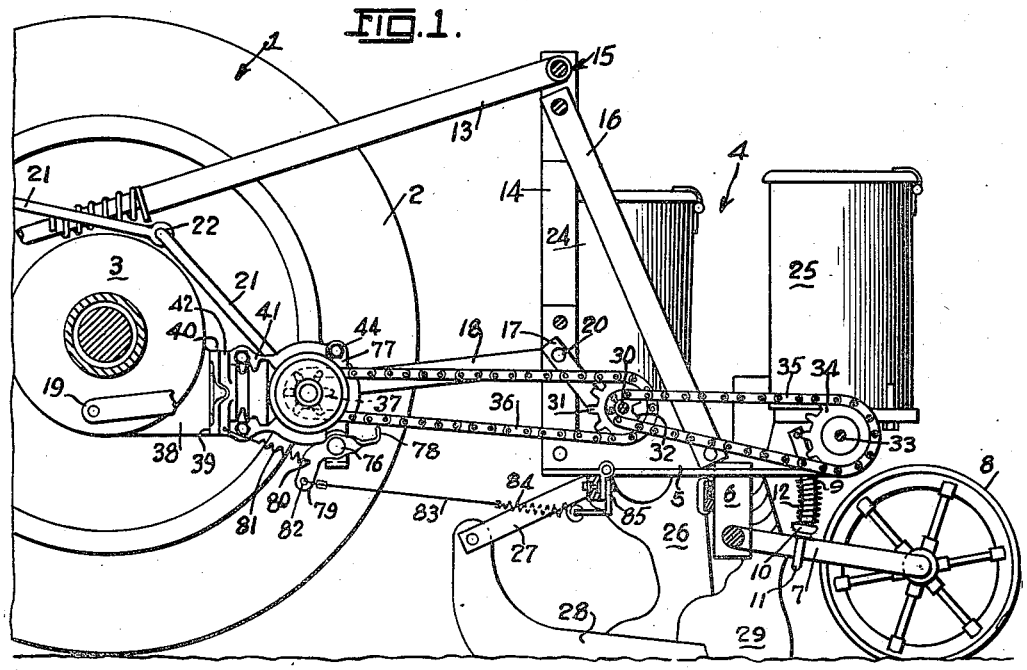
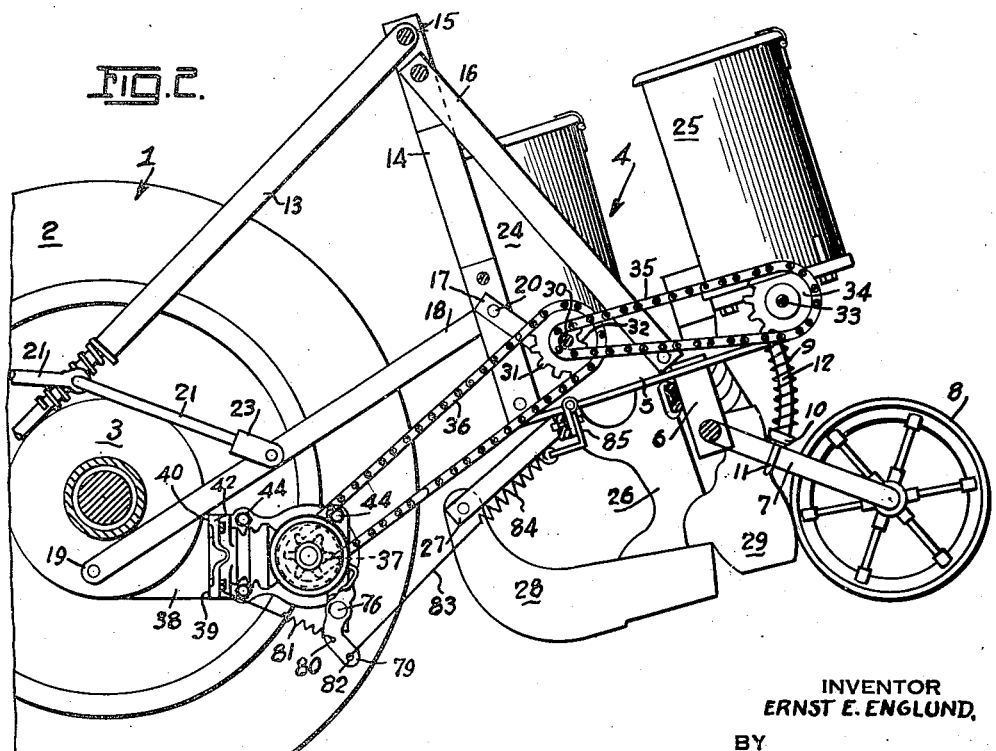
INVENTOR
ERNST E. ENGLUND,
BY
Toulmin & Toulmin
ATTORNEYS Jan. 18, 1944. E. E. ENGLUND 2,339,689
SEED PLANTER
Filed Aug. 27, 1942 2 Sheets-Sheet 2
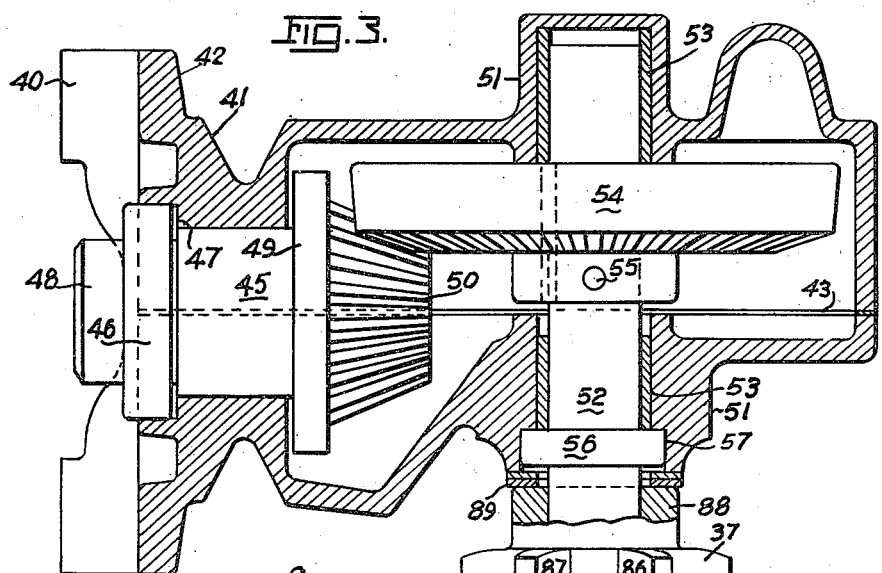
INVENTOR
ERNST E. ENGLUND
BY
Toulmin & Toulmin
ATTORNEYS Patented Jan. 18, 1944

2,339,689

UNITED STATES PATENT OFFICE 2,339,689

SEED PLANTER

Ernst E. Englund, Bellevue, Ohio, assignor to The Ohio Cultivator Co., Bellevue, Ohio, a corporation of Ohio Application August 27, 1942, Serial No. 456,405

8 Claims. (Cl. 111—67)

The present invention relates to farm machinery, and more particularly to corn planters.

A corn planter usually comprises a tractor and a planter accessory carried on a hitch and hauled by a tractor. This accesssory includes among other elements a shoe plow, one or more corn hoppers and fertilizer hoppers together with the necessary devices for driving the feeding mechanism within the hoppers. When the planter is being moved across the edge of the field, between rows or other non-planting positions, it is desirable to stop the feeding mechanism as any corn or fertilizer dropped on these positions is wasted.

In accordance with the invention disclosed in my application Ser. No. 424,440, filed December 26, 1941, the feeding mechanism is coupled to a clutch which is mounted on a shaft directly below the corn hopper. The power for driving the clutch is taken off the tractor differential through a sprocket chain.

When it is desired to stop the feeding operation, the tractor hitch is elevated by the operator and the clutch is automatically thrown out by a camming effect.

While an arrangement of this sort is satisfactory, it has been found that the mechanism is somewhat complicated in that the power take-off and the clutch mechanism constitute separate elements inter-connected by a sprocket chain.

An object of the present invention is to simplify the mechanism and in particular to combine the power take-off mechanism and the clutch in a single housing and otherwise to improve the mechanism by which the clutch is disengaged when the planter is being hauled over the non-planting positions.

The invention will be better understood when reference is made to the following description and the accompanying drawings in which:

Figure 1 is a side elevational view of a tractor driven corn planter improved in accordance with the present invention.

Figure 2 shows the corn planter of Figure 1 in its elevated non-planting position.

Figure 3 is a longitudinal sectional view, with a few parts in elevation, of the improved combined clutch and power take-off mechanism.

Figures 4 and 5 are sectional views of the improved clutch taken along line a—a in Figure 3, these figures showing the relation of parts when the clutch is engaged and disengaged respectively.

Referring more particularly to Figures 1 and 2, reference character 1 generally designates any suitable form of tractor provided with heavy traction tires 2 and a rear axle differential indicated at 3. The planter generally designated by the reference character 4 is detachably connected to the tractor at the differential housing by means of any suitable form of rigid hitch of which one type will be described presently.

The horizontal framework of the planter in general comprises a pair of spaced U-shaped structural members (not shown) extending transversely of the machine, together with a pair of heavy angle iron pieces 5 which extend across the U-shaped structural members and preferably positions where the greatest load is applied which would normally be directly over the ground wheels. There may also be provided a third angle iron element (not shown) which extends between the transverse structural members at a position which corresponds with the central longitudinal axis of the planter. The frame may be additionally spanned by rigid bars (not shown) which carry standard types of pulley holders and tripping catches employed in connection with the check wire planting operation. Depending downwardly from the frame there is a pair of spaced brackets which serve as hangers for U-shaped shaft 7 carrying at its ends a pair of tapered ground wheels 8. These ground wheels serve to support the rear end of the planter and in addition serve to cover up the said corn after it has been planted as will be explained hereinafter.

In order to provide for unevenness of terrain, compression springs 9 may be inserted between ledges extending rearwardly of the frame and carried in cups 10 which are secured by a yoke 11 to the U-shaped shaft 7. A rod 12, preferably of arcuate shape, may be encased by each spring in order to maintain rigidity of the planter frame in the horizontal direction. Thus the frame is resiliently supported at the rear by the springs 9 these springs serving to rotate the shaft 10 until the wheels touch the ground. The front end of the rectangular framework is secured to the differential housing of the tractor preferably through a triangularly shaped hitch. The main purpose of this hitch is to permit the frame of the planter to be swingably elevated when necessary so as to remove the wheels 8 from the ground as can be seen in Figure 2.

This hitch consists essentially of a heavy metal bar swivelly mounted on a lug (not shown) which projects outwardly from the differential housing 3. The bar 13 is swivelly received by a heavy metal framework, which, in general, consists of a vertically downwardly extending bar 14 swivelly connected at one end to the bar 13 at 15 and at the other end is rigidly secured to one of the bars of the planter framework. There is a diagonal bar 16 which extends between the vertical upright 14 and positioned on the planter framework at the rear of the planter, this bar serving as a reinforcing member. The hitch is completed by a pair of bars (not shown) which extend on opposite sides of the bar 14 in a direction transverse of the planter and connected at the lower ends to outermost positions on the planter frame. The other end of these last-mentioned bars may be carried at the swivel 15. A diagonal reinforcing member 17 may be secured between the upright 14 and an intermediate position on the planter framework. This diagonal member is of considerably less length than the diagonal 16 as can be seen on the drawings. A bar 18 is connected between a swivel 19 on the tractor differential and a swivel 20 at the lower end of the upright bar 14. Thus the hitch and the frame secured thereto are pivotally mounted on the differential housing 3. In order to raise the hitch, connecting rods 21 swivelly jointed at 22, extend from the operator's position (not shown) to a bifurcated yoke 23 which is swivelly mounted on the bar 18, so that if the rods 21 are pulled up by the operator the entire hitch and the framework connected thereto are caused to be elevated from the ground as can be seen in Figure 2.

The front end of the planter framework usually supports one or more hoppers or cans 24 containing seed corn and directly to the rear of these hoppers and mounted in any suitable manner on the framework there is provided one or more cans of fertilizer indicated at 25. There is a corn chute 26 for each hopper 24, secured to the underside of the planter framework and positioned directly below its hopper. The chute is usually made in the form of a hollow casting of irregular shape with machined surfaces so positioned as to carry a bar 27 for supporting the front end of a plow shoe 28. The rear end of the shoe may be bolted or otherwise secured to another machined surface on the chute 26. The latter is provided with an opening for the seed corn to pass after the corn has been dropped from the hopper 24 in any predetermined sequence depending upon the type of planting.

Directly to the rear of each corn chute 26 there is a fertilizer chute 29 which may also be made in the form of a hollow casting and having a passageway through which fertilizer from the hopper 25 is dropped at a predetermined rate, and deposited directly on the seed corn which had been dropped immediately before by the chute 26. The ground wheels 8 in following up this operation cause the soil to be spread over the corn and fertilizer in a manner well known in the art.

It is apparent that when moving the planter over positions between rows or at the ends of the field, it may be desirable that the feeding of the corn and fertilizer be temporarily stopped. In accordance with the present invention an improved mechanism has been devised by which this can be accomplished in an effective but highly simplified manner.

The feeding mechanism of the corn hopper 24 is actuated by a shaft 30 which extends transversely of the planter and is provided with a large sprocket 31 and a smaller sprocket 32. The feeding mechanism of the fertilizer hopper 25 is likewise actuated by the horizontally disposed shaft 33 driven by a sprocket 34. A sprocket chain 35 communicates power between the small sprocket wheel 32 and the fertilizer sprocket wheel 34. Mechanical power is transmitted to the sprocket 31 and also to the sprocket 32 by means of a chain 36 which passes around a sprocket 37 forming part of the improved combined power take-off and clutch mechanism which will now be described.

*Power take-off and clutch mechanism*

This mechanism is in general supported from a housing 38 which is secured as for example by casting to the housing which contains the tractor differential 3. The right hand side of the housing 38 as seen in Figure 1 terminates in a machined surface 39 and abutting therewith, there is a spacer plate 40 (Figure 3) which separates a casting 41 from the housing 38. This casting as seen in Figure 3 is provided with a bossed base 42 having holes for receiving bolts which pass through the base and the spacer plate into the machined surface of the housing 38 in order rigidly to support the casting 41 in position. The latter has an irregular shape and in general is formed of two parts to constitute upper and lower casings with the joint being rendered moisture proof by means of a gasket 43 in Figure 3. These casings may be bolted together at four different positions as indicated at 44 in Figures 1 and 2. A shaft 45 is journalled within the left hand portion of the bolted casing as seen in Figure 3 this shaft being provided with a shoulder 46 which loosely fits within a counter bore 47 in the casting 41 and terminates at left hand end in a round portion 48. The latter is provided with a splined bore (not shown) for receiving a splined shaft which projects through the housing 38 and is mechanically coupled through gearing (not shown) forming part of the tractor differential 3. Thus when the rear axle of the tractor is rotating the power of the axle is transmitted through suitable gearing to the shaft 45. The right hand end of the shaft (Figure 3) is also provided with a shoulder shown at 49 which forms part of a beveled gear element 50. The casings 41 are provided with bearings indicated generally at 51 in vertical alignment, these bearings being adapted rotatably to receive a shaft 52 which is disposed at right angles to the shaft 45. A sleeve 53 of any suitable bearing material, preferably bronze may be inserted between the shaft and the immediately adjacent surfaces of the casting 41. The shaft 52 carries at its upper end a beveled gear 54 which may be secured to the shaft by a pin 55 the gear being engaged by the beveled gear 50. Thus the rotation of the shaft 45 causes the shaft 52 to also rotate.

The shaft 52 is provided with a collar 56 which rides in a shouldered groove 57 formed in the lower bearing member 51. The shaft extends for a substantial distance below the shoulder 56 and is provided at its lower end with a cup shaped casting 58 having a hub 59 through which a pin 60 is driven into the shaft. Resting on the upper surface of the casting 58 there is another cap shaped casting 61 which has a depending hub 62 loosely mounted on the shaft 52. The casting 61 is flanged as indicated at 63, this flange being peripherally complete except for a relatively small cut-away portion through which a pawl arm 64 extends. This arm is shown more completely in Figures 4 and 5 and as illustrated is swivelly carried on a stud or pin 65 which is secured to the casting 61. The lower end of the stud 65 is secured to a lug 66 which projects radially outward from the lower portion of the hub 62. Thus the pawl arm 64 is adapted to swing in the horizontal direction about the stud 65. The arm 64 is provided at its outer end with a latching surface indicated at 67 which extends through the opening and the peripheral flange 63 can be seen in Figure 4. The arm is also provided with a downwardly extending stud 68 on which is rotatably mounted a roller 69 which contacts the interior surface of the lower casting 58 as will be described in detail presently. The arm 64 is also provided with a flat extending portion 70 against which presses a compression spring 71 (Figures 4 and 5); the other end of the spring presses against and is secured to a lug 72 which is formed integral with the hub 62.

The interior peripheral surface of the casting 68 is provided with an irregularly curved configuration which may be broadly described as being scalloped and formed of curved and straight portions designated 73 and 74 respectively. The straight portions extend in a direction opposite to the direction of rotation and also extend radially inward to some extent for purposes which will be evident when the operation of the clutch has been described. The recesses 73 preferably have a curvature corresponding with the diametral size of the rollers 68.

Directly below the clutch there is a pivotally mounted latching device 75, the pivot being indicated at 76 and carried on a strap 77 which extends vertically downwardly and is secured to any convenient surface on the housing 41. The latching device 75 is provided at one end with a hook portion indicated at 78 which is adapted to be swung about the pivot 76 inwardly against the latching device 67 of the pawl arm 64 and to rotate the latter about its pivot 65 to compress the spring 71. The latched position of the latch 75 is shown in Figure 5. The latch is normally held out of latching position by means of an arm 79 which may be integral with the latching device and is provided with an opening 80 to which a tension spring 81 may be connected. The latter is anchored in the housing 41 as can be seen in Figures 1 and 2. The lower end of the arm 79 is provided with a second opening 82 which receives a steel cord 83 connected to one end of a heavy tension spring 84. The other or upper end of the spring 84 is secured in any suitable manner to the main frame of the planter as indicated at 85 preferably by means of a device which permits adjustment. The purpose of this steel cord will be explained hereinafter.

One or more driving segments 86 extend upwardly from the upper casing 61 of the clutch and are preferably formed integral therewith. These segments may have an arcuate configuration and are spaced apart to permit the insertion of one or more driven segments 87 of similar configuration. The latter are preferably integrally joined to the sprocket 37. The sprocket and its segments 87 may be conveniently formed as a heavy collar 88, loosely carried on the shaft 52. Thrust bearing washers 89 may be inserted between the upper surface of the collar 88 and the lower surface of the hub portion which depends from the lower housing 41.

*Operation of the improved clutch and power take-off*

First assume that the planter is in its nonelevated position as shown in Figure 1 and is being drawn by the tractor 1 so that the shoe 28 enters the ground and corn and fertilizer are being successively deposited in the furrows. The length of the cable 83 is so designed that practically no pull is exerted on the arm 79 and the tension spring 81 has caused the latch 78 to become disengaged from the latching surface 67 as shown in Figure 4. Under these conditions the power is transmitted from the tractor differential through the necessary gears contained within the casing 38 to the shaft 45, through the beveled gears 50, 54 to the shaft 52. Inasmuch as the lower casting 58 of the clutch is pinned to the shaft, this casting is caused to rotate in a clockwise direction as seen in Figures 4 and 5. The compression spring 71 serves to force the roller 69 into the curved recesses 73 of the clutch so that the lug 66 and the upper casting 61 of the clutch are caused to rotate at the same speed as the lower casting 58. The fact that the straight portions 74 of the scalloped surface within the lower casting extend somewhat downwardly in the radial direction also serves to increase the friction with which the roller 69 is held against the scalloped surface including the recesses 73. It will also be noted that the direction of the lower casting 58 (counterclockwise as seen in Figure 4) is such that the arm 64 tends to straighten itself about its pivot 65 to give a radially outward thrust to the roller against the scalloped surfaces. All of these effects prevent any relative movement or slippage in a circular direction between the arm 64 and the lower casting 58 during the driving operation. The upper casting is therefore positively driven by the shaft 52 and this driving action is transferred from the driving segment or segments 86 to the segment or segments 87 of the sprocket, thus causing the latter to rotate at the same speed as the shaft. The sprocket 37 is mechanically connected through the chain 18 to the sprockets 31, 32 of the corn feeding mechanism and with the sprocket 34 through the chain 35 of the fertilizer feeding mechanism. Thus under these conditions power is taken from the tractor differential through the clutch to operate the feeding mechanisms of the corn and fertilizer hoppers.

Let us now assume that the tractor and the planter have reached a position on the field where it is no longer desired to drop corn and fertilizer for example while the planter is moving between rows or is being driven along the highway. The operator will pull up on the rods 21 by any suitable wheel or lever system (not shown) to elevate the planter above the ground. This is the position shown in Figure 2. A tensioning force is thus automatically applied to the spring 84 which causes the arm 79 of the latch 75 to rotate counterclockwise about its pivot 76 as seen in Figures 4 and 5. The pull on the spring 84 is sufficiently strong to overcome the tension of the spring 81. The latching surface 78 will reach in through the opening in the flange 63 of the upper casting 61 to engage the pawl arm 64 in the manner shown in Figure 5, thus causing the arm to swing in the clockwise direction about its pivot 65 and compressing spring 71. This operation serves to withdraw the roller 69 from its immediately adjacent recess 73. The lug 66 of the upper casing 61 is therefore disengaged from the lower casing 58 which is being driven by the shaft 52 and the sprocket 37 is accordingly stopped. There is therefore disclosed a convenient and simplified apparatus for stopping the corn and fertilizer feeding mechanism when the planter is elevated by the operator.

Immediately upon lowering the planter to its planting position, the tensioning force on the spring 84 is released and the spring 81 will exert its effect on the arm 79 to disengage the latch 75 from the latching surface 67 of the pawl arm. The compression spring 78 will thereupon cause the arm to rotate counterclockwise about its pivot 65 and to force the roller 69 into engagement with one of the recesses 73 so that the clutch becomes engaged.

It is evident from the foregoing that I have disclosed an improved form of combined power take-off and clutch mechanism for a liftable seed planter, this mechanism being all contained in a single unit and adapted to be secured to the differential housing of the tractor. The fact that the mechanism forms part of the tractor unit rather than being mounted on the planter as in my prior application referred to hereinbefore offers the advantage that the mechanism may be used with any one of a number of planters so that the cost of manufacturing the latter may be considerably reduced. All of the parts of the clutch mechanism are of sturdy construction and of a simplified type so that these parts may be readily replaced away from the factory and even by the farmer who has very few if any mechanical tools. None of the parts require any machining operation except the pivots, the swivel pins and the roller so that the cost of the clutch and power take-off mechanism is reduced to a minimum.

Having thus fully described my invention, what I claim is new and desire to secure by Letters Patent, is:

1. A planter comprising a hopper mounted on a frame which is adapted to be hitched to a power driven vehicle, means for elevating said frame, feeding mechanism for said hopper and means actuated by said vehicle for driving said feeding mechanism, said means including a combined power take-off and clutch unit mounted on and forming part of said vehicle and means for automatically disengaging the clutch portion of said device when the planter frame is elevated, said last mentioned means including a tensioned cable which extends between the actuating device of the clutch unit and the planter frame.

2. A planter comprising a hopper mounted on a frame which is adapted to be hitched to a power driven vehicle, feeding mechanism for said hopper, and means including a combined power take-off and clutch device actuated by said vehicle for driving said feeding mechanism, said device including a shaft driven from the vehicle, a hollow clutch unit formed in two parts, one of said parts being secured to said shaft and the other part being loose on the shaft, a pawl arm secured to the loose clutch part and in frictional engagement with the secured clutch part, a sprocket gear mechanically connected to said loose clutch part and a sprocket chain leading from said sprocket to the feeding mechanism of said hopper.

3. A planter comprising a hopper mounted on a frame which is adapted to be drawn by a power driven vehicle, means for elevating the frame feeding mechanism for said hopper and means including a combined power take-off and clutch device for driving said feeding mechanism, said device comprising a shaft driven from the vehicle, a clutch formed of two hollow parts, one of which is secured to said shaft and the other is loosely mounted on the shaft, a pawl arm secured to the loose clutch part and in spring pressed frictional engagement with the secured clutch part, a sprocket gear in driving engagement with the loose clutch part and a sprocket chain connected between the sprocket gear and said hopper feeding mechanism, and means automatically operable when the frame is elevated for overcoming the spring tension on said pawl arm and to permit the arm to be withdrawn out of engagement with the secured clutch part whereby the clutch is disengaged and no power is transmitted from the sprocket to the hopper feeding mechanism.

4. A planter comprising a hopper mounted on a frame which is adapted to be drawn by a power driven vehicle, means including a combined power take-off and clutch unit actuated by said vehicle for driving said feeding mechanism, said unit comprising a shaft driven from the vehicle, a pair of flanged caps facing one another to form a compartment, one of said caps being secured to the shaft and the other being loose on the shaft, said secured cap having an irregular surface on the interior of the flange, and means including a pawl arm within the compartment and bearing against said surface for driving the loose cap from the secured cap, and a sprocket and chain connection between the loose cap and the feeding mechanism of the hopper.

5. A planter comprising a hopper mounted on a frame which is adapted to be drawn by a power driven vehicle, means including a combined power take-off and clutch unit actuated by said vehicle for driving said feeding mechanism, said unit comprising a shaft driven from the vehicle, a pair of flanged caps facing one another to form a compartment, one of said caps being secured to the shaft and the other being loose on the shaft, said secured cap having an irregular surface on the interior of the flange, an opening through the flange of at least one of said caps, a pawl arm extending into the opening and terminating in a latching portion, said arm being pivotally mounted on the loose cap, and being spring pressed into engagement against the irregular surface of the secured cap, a driving connection between said loose cap and the hopper feeding mechanism and means engaging said latching portion for withdrawing the pawl arm away from the interior surface of the secured cap in order to disengage the clutch and to stop operation of the feeding mechanism.

6. A planter comprising a hopper mounted on a frame which is adapted to be hitched to a power driven vehicle, means for elevating said frame, feeding mechanism for said hopper and means actuated by said vehicle for driving said feeding mechanism, said means including a combined power take-off and clutch device, said device comprising a shaft driven from the vehicle, a pair of hollow flanged clutch parts facing one another to form a compartment, one of said parts being secured to the shaft and the other being loosely mounted on the shaft, the flange of said secured clutch part being provided with a plurality of scalloped surfaces on the interior of its flange, a roller spring pressed against the surface and carried on an arm, said arm being pivotally mounted in the loose clutch part and means extending between said arm and frame for causing engagement and disengagement between said roller and the secured clutch part depending on whether the frame is in a horizontal or in an elevated position and a mechanical connection between the loose clutch part and the feeding mechanism.

7. A planter comprising a hopper mounted on a frame which is adapted to be hitched to a power driven vehicle, means for elevating said frame, feeding mechanism for said hopper and means actuated by said vehicle for driving said feeding mechanism, said means including a combined power take-off and clutch device, said device comprising a shaft driven from the vehicle, a pair of flanged caps facing one another to form a compartment, one of said caps being secured to the shaft and the other being loosely mounted on the shaft, the inner flanged surface of said secured cap being provided with a scalloped configuration, means including a pawl arm within said compartment which bears against said scalloped surface for driving the loose cap from the secured cap, said pawl terminating in a latching portion, and means including a pivotally mounted latch for engaging said latching portion when the frame is elevated above the ground in order to withdraw the pawl arm out of engagement with the scalloped surface and thereby to stop rotation of the loose cap on its shaft, and a sprocket and chain connection between said loose cap and the hopper feeding mechanism.

8. In combination, a tractor of the automotive type having a differential housing, a planter hitched to said tractor and a hopper mounted on the planter, feeding mechanism for said hopper, means for elevating the planter including the hopper feeding mechanism, a combined power take-off and clutch device secured to the differential housing of the tractor, mechanical driving means between said device and said feeding mechanism, and means operable upon the elevation of the planter above the ground for disengaging said clutch in order to stop the transmission of power from said power take-off device to said hopper feeding mechanism.

ERNST E. ENGLUND.